(12) United States Patent
Rahman et al.

(10) Patent No.: US 7,499,395 B2
(45) Date of Patent: Mar. 3, 2009

(54) BFD RATE-LIMITING AND AUTOMATIC SESSION ACTIVATION

(75) Inventors: Reshad Rahman, Ottawa (CA); David Toscano, Ottawa (CA); David Ward, Somerset, WI (US); Jean-Marc Simard, Gatineau (CA); Christian E. Hopps, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 709 days.

(21) Appl. No.: 11/083,471

(22) Filed: Mar. 18, 2005

(65) Prior Publication Data

US 2006/0209685 A1 Sep. 21, 2006

(51) Int. Cl.
*H04L 12/26* (2006.01)
(52) U.S. Cl. .................. 370/229; 370/241; 709/227
(58) Field of Classification Search .............. 370/352, 370/229, 241, 253, 401; 709/217, 227, 228, 709/229, 232, 235; 710/107
See application file for complete search history.

(56) References Cited

U.S. PATENT DOCUMENTS

| 6,253,270 | B1* | 6/2001 | Ajanovic et al. | 710/107 |
| 6,614,781 | B1* | 9/2003 | Elliott et al. | 370/352 |
| 7,089,293 | B2* | 8/2006 | Grosner et al. | 709/217 |
| 7,221,656 | B1* | 5/2007 | Aweya et al. | 370/252 |
| 2002/0186661 | A1* | 12/2002 | Santiago et al. | 370/252 |
| 2006/0028981 | A1* | 2/2006 | Wright | 370/229 |
| 2006/0126504 | A1* | 6/2006 | Meier et al. | 370/229 |

OTHER PUBLICATIONS

Aggarwal, Rahul; "OAM Mechanisms in MPLS Layer 2 Transport Networks;" IEEE Communicaions Magazine; pp. 124-130; Oct. 2004.*
Katz et al; "Bidirectional Forward Detection draft-ietf-bfd-base-00.txt;" Network Working Group; Jul. 2004.*
Katz et al; "Forwarding Plane Failover Detection;" www.nonog.org; Jun. 2003.*

* cited by examiner

*Primary Examiner*—Min Jung
(74) *Attorney, Agent, or Firm*—The Law Offices of Bradley J. Bereznak

(57) ABSTRACT

A system and method for bidirectional forwarding detection (BFD) rate-limiting and automatic BFD session activation includes tracking a total bidirectional forwarding detection (BFD) packet rate for a line card (LC) of the node, and rejecting operations associated with creation of a new BFD session that would cause the total BFD packet rate to exceed a predetermined maximum rate. The new BFD session is stored in a state on the node and the operations of the new BFD session are automatically retried at a time when doing so would not exceed the predetermined maximum rate. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

12 Claims, 4 Drawing Sheets

| Version | Diag | H | D | P | F | Rsvd | Detect Mult | Length |
|---------|------|---|---|---|---|------|-------------|--------|
| My Discriminator ||||||||||
| Your Discriminator ||||||||||
| Desired Min Tx Interval ||||||||||
| Required Min Rx Interval ||||||||||
| Required Min Echo Rx Interval ||||||||||

FIG. 1
(PRIOR ART)

BFD RATE-LIMITING AND AUTOMATIC SESSION ACTIVATION

FIELD OF THE INVENTION

The present invention relates generally to data communications systems; more specifically, to network routers and techniques for detecting link or node failures in a packet-based network.

BACKGROUND OF THE INVENTION

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size"of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

In modern network technology, nodes such as routers and switches are commonly utilized to forward data packets toward their destinations. (In the context of the present application, the terms "node", "router", and "switch" are used synonymously and interchangeably.) Routers basically keep a local copy of the network topology in a link state database. For example, U.S. Patent Application No. 2004/0252707 teaches a system and method for maintaining network system information. U.S. Patent Application No. 2005/0041676 describes link state routing algorithms, such as the well-known Open Shortest Path First (OSPF) algorithm, which permit the construction of a network topology such that any given node may make packet-forwarding decisions.

Each router in a given network typically has several data paths, each servicing different forms of traffic. For instance, transit traffic is usually forwarded from the ingress line card (LC) to the fabric, and then to the egress LC for next hop delivery to a neighboring router. Other data paths for router traffic may include one or more paths for traffic requiring local processing. Each LC typically has its own central processing unit (CPU). Most often, each router includes a route processor for local processing of data received from the line cards, handling routing protocols, running applications, managing traffic, etc.

In routed networks, it is important to detect when a link or node failure occurs. In the past, routers periodically sent "hello" messages over all active interfaces to determine the state of the neighboring routers and to detect failures. According to this scheme, when a message from a neighbor is not received for a time exceeding some predetermined period, the adjacent nodes conclude that a failure occurred so that appropriate procedures may be initiated. By way of further background, U.S. Pat. No. 6,530,032 describes a network fault recovery mechanism.

The chief drawback with the use of hello messages as a network failure detection mechanism is that the detection periods tend to be long, resulting in significant lost data traffic. Fast convergence also requires that the failure be detected as rapidly as possible. For example, in OSPF the minimum interval for hello packets is one second, and the link is considered down after three hello packets are lost. Furthermore, neighboring nodes running different protocols, each with their own version of hello messages, often lacked the ability to negotiate compatible hello intervals.

Bidirectional forwarding detection (BFD) is a liveliness testing protocol described in draft-ietf-bfd-base-00.txt that overcomes many of the problems with past hello messaging approaches. BFD operates independent of media, data protocols, and routing protocols to detect faults in the bidirectional path between two forwarding engines, including interfaces and data links. In routers, BFD is typically implemented in the forwarding plane to keep it independent from the control plane functions.

The BFD protocol works by establishing a session in which neighboring devices first negotiate a set of configuration parameters that includes a BFD packet interval rate. For example, FIG. 1 illustrates a conventional BFD control packet format, which includes various desired/required minimum transmit (Tx) and receive (Rx) intervals. Other BFD packet fields include a diagnostic ("Diag") field for indicating detection time expired, echo failed, etc.; a "H" (I hear you) bit, set when receiving packets from a remote device; a demand mode ("D") bit, set when operating in Demand mode; a "P" (poll) bit, set when requesting parameter change; a "F" (final) bit, set when responding to a received packet with a P bit; and a "Detect Mult" bit field, used to calculate a detection time.

BFD can work in asynchronous mode, in which the rate at which different nodes send BFD packets may differ, or in demand mode, in which BFD packets are sent only when it is desired to test the data path. BFD also has an echo mode, in which a node sends a stream of BFD packets that gets looped back, basically testing the capability of the other node to switch packets back to the sender.

Although BFD has been useful in reducing the time it takes to detect a link or node failure in a network, there are still certain problems that can arise with the use of BFD, leading to undetected faults or false positive alarms. For example, in a Denial-of-Service (DoS) attack, an unscrupulous hacker typically floods a router with a high volume of data traffic that can overwhelm its processing capabilities. To protect the router's processor against such attacks, a packet rate-limiting device known as a hardware policer is usually implemented in the forwarding engine. The purpose of the hardware policer is to limit the rate of incoming data packets to protect the LC CPU against a DoS attack.

One problem is that incoming BFD packets may be sent to the LC CPU at a rate that exceeds the maximum rate, e.g., 7000 packets-per-second (pps), of the hardware policer. There are cases, for instance, where BFD sessions are over-configured such that the data packet requirements are greater than 7000 pps on one LC. By way of example, 400 Virtual Local Area Networks (VLANs) may be added in an OSPF area that has BFD enabled globally at 50 ms intervals and already has 300 existing VLANs. This would require an additional 8,000 pps on top of the 6,000, pps (for the existing 300 VLANs) for a total of 14,000 pps. As a result of the creation of the 400 additional VLANs, 50% of the BFD packets would be dropped. This could cause existing BFD sessions to "flap" (i.e., produce a false positive), resulting in unnecessary network traffic or "churn". On the other hand, if the 400 new BFD sessions are not created, a network operator would be required to manually "activate" these sessions at a later time when resources are free, e.g., if the 300 VLANs are removed. Neither of these result scenarios is desirable.

Thus, what is a needed is an improved mechanism for BFD rate-limiting and BFD session activation which overcomes the problems inherent in the prior art.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 1 shows a conventional BFD control packet format.

DETAILED DESCRIPTION

A system and method for BFD rate-limiting and automatic BFD session activation is described. In the following description specific details are set forth, such as data rates, protocols, configurations, etc., in order to provide a thorough understanding of the present invention. However, persons having ordinary skill in the networking arts will appreciate that these specific details may not be needed to practice the present invention.

According to one embodiment of the present invention, a state machine implemented on a line card of a network node (e.g., a router) operates to rate-limit BFD sessions without dropping BFD packets. The state machine may be embodied in software, hardware, firmware, or in another machine-readable form. In the event that BFD sessions are over-subscribed or over-configured, previously created sessions (via configuration) are maintained in an administrative "down" (ADMIN_DOWN) state, analogous to a waiting room. The down BFD sessions do not transmit or receive packets. When pps resources are less constrained, these down BFD session are activated (i.e., brought up) without user intervention. Additionally, when a user attempts to modify the transmit and/or receive intervals of BFD sessions that are currently up, but there is a lack of available pps bandwidth, the sessions remain in an unmodified (and up) state. When sufficient pps resources become available, any pending session modifications are automatically applied without user intervention.

Figure 2:
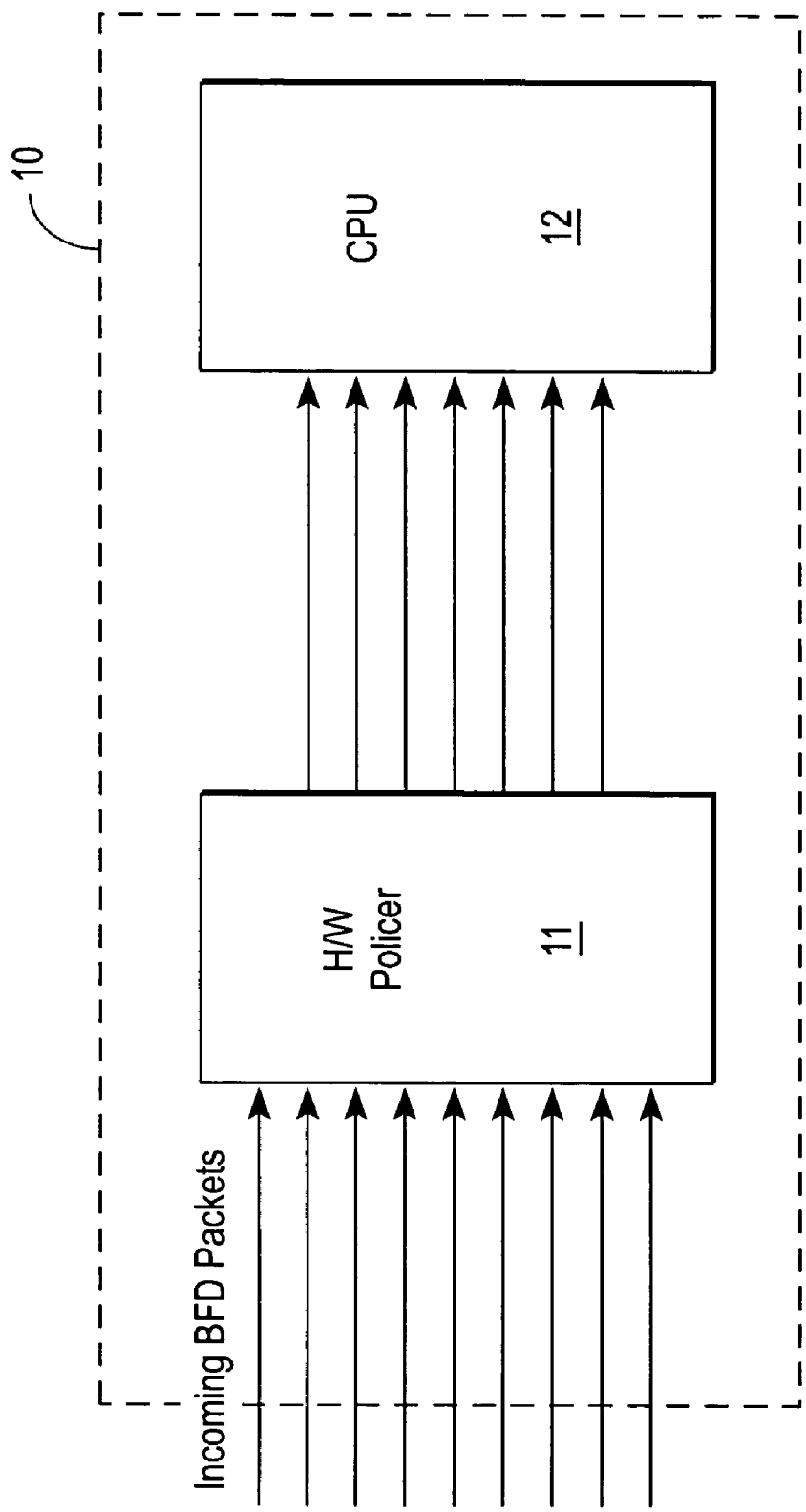
FIG. 2 illustrates a router line card in accordance with one embodiment of the present invention.

Referring to FIG. 2, an example router line card (LC) 10 is shown including a CPU 12 coupled with a hardware (H/W) policer 11. Policer 11 operates to receive incoming BFD packets, which are then transmitted to CPU 12 as long as the predetermined packet rate (e.g.; 7,000 pps) of policer 11 is not exceeded. For example, in the event that BFD packets arrive at a rate exceeding 7,000 pps, which could happen even in the absence of a DoS attack, policer 11 is normally configured to drop "good" BFD packets (corresponding to existing sessions) randomly.

To prevent this from happening, CPU 12 executes a software routine or program that implements a state machine which achieves BFD session rate limiting without dropping packets. (It is appreciated that the state machine program may also reside and be executed off line card 10, i.e., in another area of the node.) The state machine program monitors and tracks the total BFD pps for line card 10. For instance, a BFD session created at a 50 ms interval requires 20 pps. Any BFD session operations (e.g., create/modify) that could cause the total BFD packet rate to exceed the rate limit of H/W policer 11 are temporarily rejected and maintained in the ADMIN_DOWN state. When pps resources free up, for example, due to session deletion, the rejected create/modify operations are automatically retried.

Figure 3:
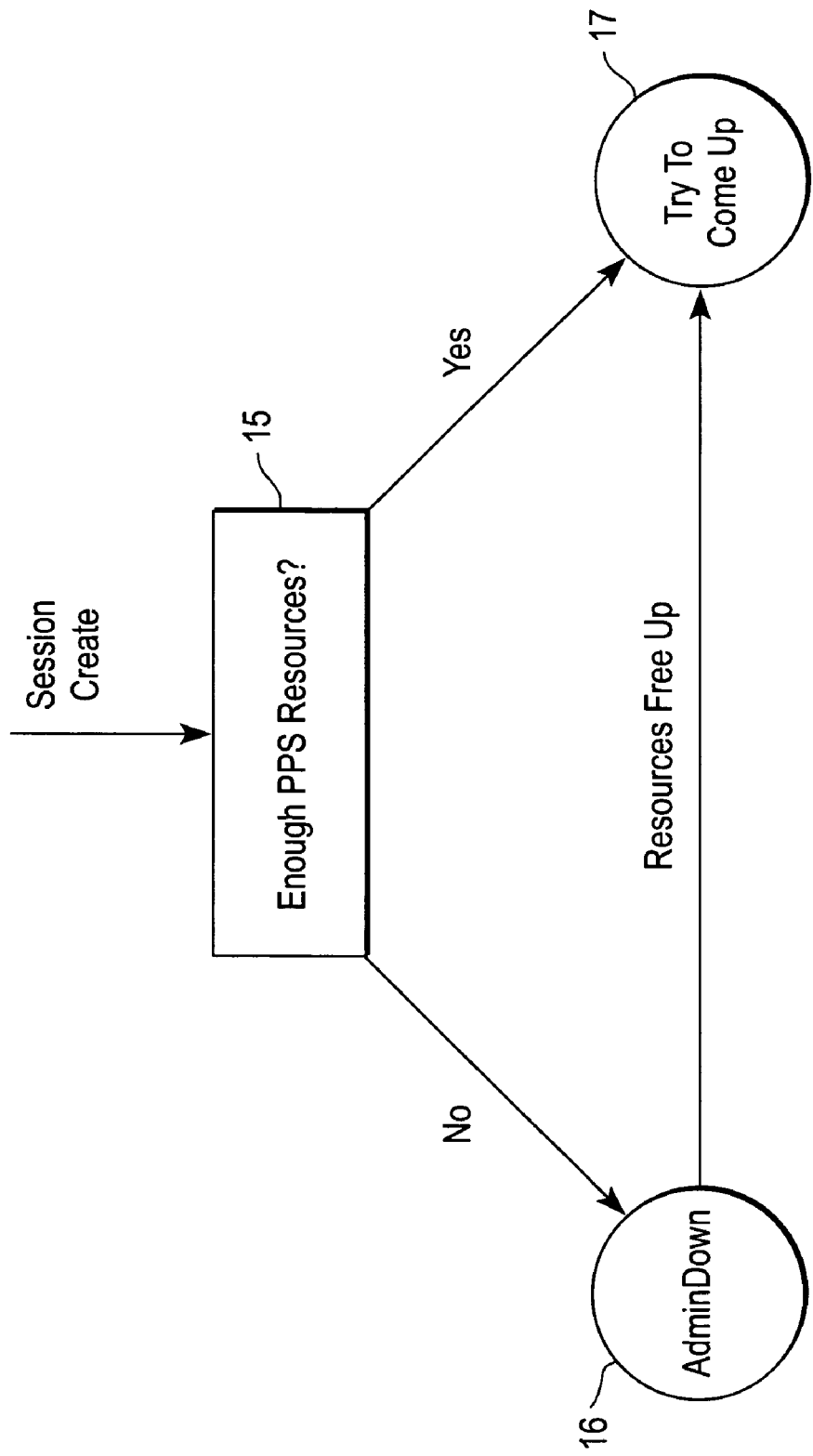
FIG. 3 is a state diagram that illustrates BFD session creation in accordance with one embodiment of the present invention.

FIG. 3 is a state diagram that illustrates BFD session creation in accordance with one embodiment of the present invention. When a new BFD session is created, a set of interval parameters (see FIG. 1) are first negotiated between the user and the router. At this point, the state machine program examines the total BFD pps currently configured for the line card and determines whether activation of the new session would exceed the pps limit of the H/W policer. This is shown taking place in state block 15. If the new BFD session would push the total BFD packet rate beyond the pps limit of the H/W policer, the program transitions to ADMIN_DOWN state 16, and the newly created BFD session is held until such time as enough pps resources are available. Although the session still exists in software, while in the ADMIN_DOWN state no BFD packets are sent or received. When there are enough pps resources free, the program transitions to state 17, wherein the node tries to bring the BFD sessions up. (Practitioners in the art will understand that if the other end is misconfigured the BFD sessions will not be activated.) Naturally, if there are enough pps resources available after the session has been created, the state machine program immediately transitions to state 17.

Figure 4:
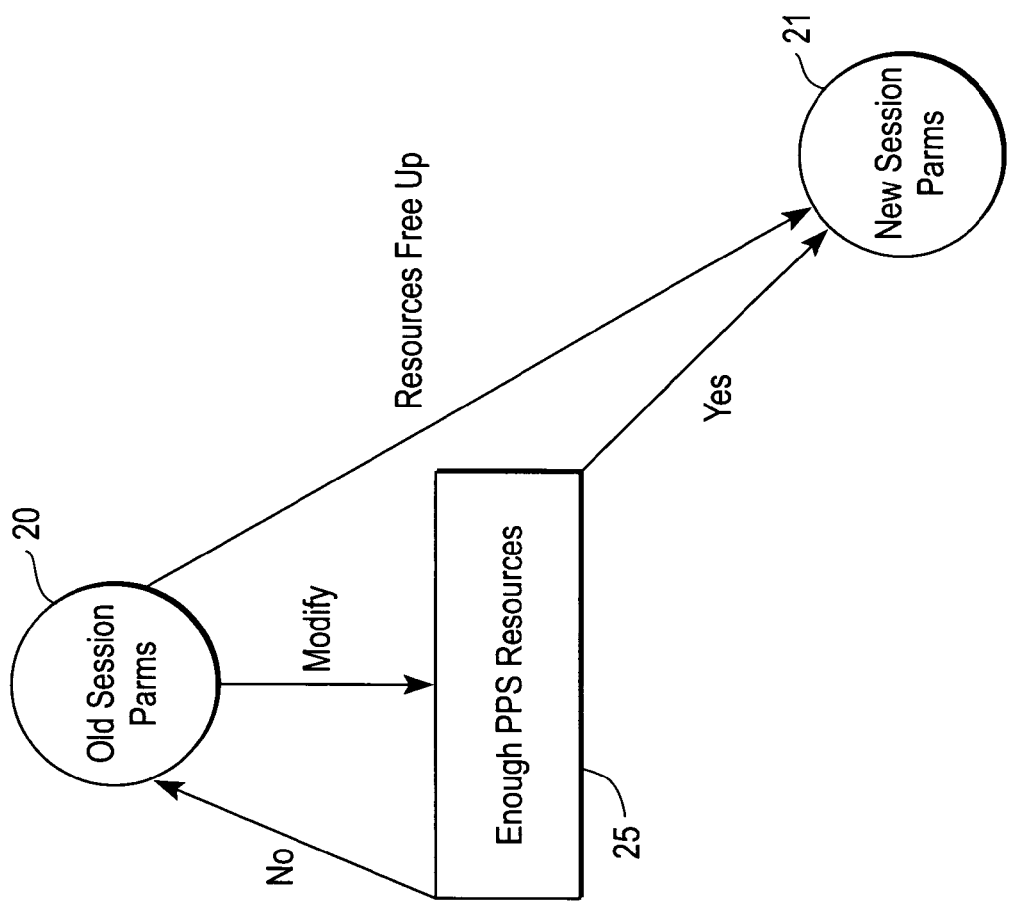
FIG. 4 is a state diagram that illustrates BFD session modification in accordance with one embodiment of the present invention.

FIG. 4 illustrates the process of BFD session modification in accordance with one embodiment of the present invention. In this state diagram, the BFD session has already been created and is currently up. That is, a set of session parameters has been negotiated and the BFD session is sending/receiving packets at the agreed upon rates (state 20). Now the user wants to modify the session parameters. For example, the session may be up at a Tx/Rx rate of 1 sec (pps) and the user sends a request to modify the session to a new Tx/Rx rate of 50 ms. The modification request causes a transition to state 25, wherein the state machine program checks the current configuration (in pps terms) to determine whether there are sufficient resources to accommodate the new session parameters. If there are adequate pps resources available (i.e., the change will not exceed the rate limit of the H/W policer), the modification is immediately accepted, as shown by the transition from state 25 to state 21 in FIG. 4. On the other hand, if there are not enough pps resources available, the change is rejected and the session continues with the old session parameters (as shown by the arrow transition from state 25 to state 20).

According to the embodiment of the present invention shown in FIG. 4, the denied modification request is not discarded; rather, the request is stored until either the user withdraws the request, sends a new modification request, or the pps resources needed to implement the parameter change are available. This latter case is shown by the transition arrow directly from state 20 to state 21.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer (e.g., a server) to a requesting computer (e.g., a customer or client) by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. For example, in the embodiments described above the state machine software basically operates to admit or reject activation of BFD sessions that have been created, or to modify requests currently up. In each case, the state machine operates with the knowledge that the H/W policer has a predetermined maximum rate at which it will accept BFD packets. However, alternative embodiments of the present invention may implement dynamic adjustment of the HW policer rate limit. Accordingly, the specification and drawings are to be regarded in an illustrative rather than a restrictive sense.

We claim:

1. A processor-implemented method of operation for a node in a network, the method comprising:
    tracking a total bidirectional forwarding detection (BFD) packet rate for a line card (LC) of the node;
    rejecting operations associated with creation of a new BFD session that would cause the total BFD packet rate to exceed a predetermined maximum rate, the new BFD session being stored in a state on the node; and
    automatically retrying the operations of the new BFD session when doing so would not exceed the predetermined maximum rate.

2. The processor-implemented method of claim 1 further comprising:
    rejecting a request to modify parameters of an existing BFD session that would cause the total BED packet rate to exceed the predetermined maximum rate.

3. The processor-implemented method of claim 2 further comprising:
    storing the request; and
    automatically modifying the parameters of the existing BFD session in accordance with the request when doing so would not exceed the predetermined maximum rate.

4. The processor-implemented method of claim 1 wherein the predetermined maximum rate is implemented in a hardware device on the line card of the node.

5. A processor-implemented method of operation for a node in a network, the method comprising:
    negotiating parameters associated with creation of a bidirectional forwarding detection (BFD) session, the parameters including a packet per second (pps) rate;
    rejecting operations associated with the BFD session that would cause a total BFD pps rate for a line card (LC) of the node to exceed a predetermined maximum pps rate of a hardware policer device of the node;
    maintaining the BFD session in an ADMIN_DOWN state on the node;
    automatically retrying the operations of the BFD session when doing so would not exceed the predetermined maximum pps rate.

6. The processor-implemented method of claim 5 further comprising:
    rejecting a request to modify parameters of an existing BFD session that would cause the total BFD pps rate to exceed the predetermined maximum pps rate.

7. The processor-implemented method of claim 6 further comprising:
    storing the request on the node; and
    automatically modifying the parameters of the existing BFD session in accordance with the request when doing so would not exceed the predetermined maximum rate.

8. A network node comprising:
    a processor; and
    a policer device coupled to the processor, the policer device being configured to deliver bidirectional forwarding detection (BFD) packets to the processor as long as a predetermined maximum packet rate is not exceeded; and
    wherein the processor is configured to reject operations associated with a new BFD session that would cause a total BFD packet rate to exceed the predetermined maximum packet rate, the new BFD session being maintained on the node and the operations being automatically retried when doing so would not exceed the predetermined maximum packet rate.

9. The network node of claim 8 wherein the processor and the policer device are associated with a line card of the node.

10. The network node of claim 8 wherein the processor is further configured to reject a request to modify parameters of an existing BFD session when doing so would cause the total BFD packet rate to exceed the predetermined maximum packet rate.

11. The network node of claim 10 wherein the processor is further configured to automatically modify the parameters of the existing BFD session in accordance with the request when doing so would not exceed the predetermined maximum rate.

12. A network node comprising:
    a processor; and
    means for delivering bidirectional forwarding detection (BFD) packets to the processor as long as a predetermined maximum packet rate is not exceeded; and
    means for rejecting operations associated with a new BFD session that would cause a total BFD packet rate for the network node to exceed the predetermined maximum packet rate, the new BFD session being maintained on the node and automatically retried when doing so would not exceed the predetermined maximum packet rate.

* * * * *